US009898526B2

(12) United States Patent
Knight et al.

(10) Patent No.: US 9,898,526 B2
(45) Date of Patent: Feb. 20, 2018

(54) COMPUTER-IMPLEMENTED SYSTEM AND METHOD FOR INCLUSION-BASED ELECTRONICALLY STORED INFORMATION ITEM CLUSTER VISUAL REPRESENTATION

(71) Applicant: FTI Consulting, Inc., Annapolis, MD (US)

(72) Inventors: William C. Knight, Bainbridge Island, WA (US); Nicholas I. Nussbaum, Seattle, WA (US)

(73) Assignee: FTI Consulting, Inc., Annapolis, MD (US)

( * ) Notice: Subject to any disclaimer, the term of this patent is extended or adjusted under 35 U.S.C. 154(b) by 0 days.

(21) Appl. No.: 15/401,450

(22) Filed: Jan. 9, 2017

(65) Prior Publication Data

US 2017/0116325 A1    Apr. 27, 2017

Related U.S. Application Data

(63) Continuation of application No. 14/263,934, filed on Apr. 28, 2014, now Pat. No. 9,542,483, which is a
(Continued)

(51) Int. Cl.
*G06F 17/30* (2006.01)
(52) U.S. Cl.
CPC .. *G06F 17/30601* (2013.01); *G06F 17/30011* (2013.01)
(58) Field of Classification Search
None
See application file for complete search history.

(56) References Cited

U.S. PATENT DOCUMENTS 3,416,150 A    12/1968    Lindberg
3,426,210 A    2/1969    Agin
(Continued)

FOREIGN PATENT DOCUMENTS

EP    0886227    12/1998
EP    1024437    8/2000
(Continued)

OTHER PUBLICATIONS

Liu et al. "Robust Multi-Class Transductive Learning with Graphs", IEEE, Jun. 2009.*
(Continued)

*Primary Examiner* — Carol Choi
(74) *Attorney, Agent, or Firm* — Patrick J. S. Inouye; Leonid Kisselev

(57) ABSTRACT

A computer-implemented system and method for inclusion-based electronically stored information item cluster visual representation is provided. A set of reference electronically stored information items is maintained. A subset of the electronically stored information items is selected from the set, each associated with a classification code, each of the classification codes associated with a visual representation different from the visual representations of the remaining classification codes. The subset is combined with a set of uncoded electronically stored information items, each associated with a visual representation different from the visual representations of the classification codes. The combined electronically stored information items are grouped into clusters. Each of the clusters is visually represented, including displaying the visual representation associated with the code of each of the reference electronically stored information items in that cluster and the visual representation associated with each of the uncoded electronically stored information item in that cluster.

14 Claims, 9 Drawing Sheets

Related U.S. Application Data continuation of application No. 12/833,860, filed on Jul. 9, 2010, now Pat. No. 8,713,018.

(60) Provisional application No. 61/236,490, filed on Aug. 24, 2009, provisional application No. 61/229,216, filed on Jul. 28, 2009.

(56) References Cited

U.S. PATENT DOCUMENTS

| | | |
|---|---|---|
| 3,668,658 A | 6/1972 | Flores et al. |
| 4,893,253 A | 1/1990 | Lodder |
| 4,991,087 A | 2/1991 | Burkowski et al. |
| 5,056,021 A | 10/1991 | Ausborn |
| 5,121,338 A | 6/1992 | Lodder |
| 5,133,067 A | 7/1992 | Hara et al. |
| 5,182,773 A | 1/1993 | Bahl et al. |
| 5,276,789 A | 1/1994 | Besaw et al. |
| 5,278,980 A | 1/1994 | Pedersen et al. |
| 5,359,724 A | 10/1994 | Earle |
| 5,371,673 A | 12/1994 | Fan |
| 5,371,807 A | 12/1994 | Register et al. |
| 5,442,778 A | 8/1995 | Pedersen et al. |
| 5,450,535 A | 9/1995 | North |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,835,905 A | 11/1997 | Pirolli et al. |
| 5,696,962 A | 12/1997 | Kupiec |
| 5,706,497 A | 1/1998 | Takahashi et al. |
| 5,737,734 A | 4/1998 | Schultz |
| 5,754,938 A | 5/1998 | Herz et al. |
| 5,754,939 A | 5/1998 | Herz et al. |
| 5,787,422 A | 7/1998 | Tukey et al. |
| 5,794,178 A | 8/1998 | Caid et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,819,260 A | 10/1998 | Lu et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,895,470 A | 4/1999 | Pirolli et al. |
| 5,909,677 A | 6/1999 | Broder et al. |
| 5,915,024 A | 6/1999 | Kitaori et al. |
| 5,915,249 A | 6/1999 | Spencer |
| 5,920,854 A | 7/1999 | Kirsch et al. |
| 5,924,105 A | 7/1999 | Punch et al. |
| 5,940,821 A | 8/1999 | Wical |
| 5,943,669 A | 8/1999 | Numata |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 5,987,457 A | 11/1999 | Ballard |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,092,091 A | 7/2000 | Sumita et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,134,541 A | 10/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,213 A | 11/2000 | Rennison et al. |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,253,218 B1 | 6/2001 | Aoki et al. |
| 6,260,038 B1 | 7/2001 | Martin et al. |
| 6,300,947 B1 | 10/2001 | Kanebsky |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,635 B1 | 4/2003 | Hu et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,564,202 B1 | 5/2003 | Schuetze et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |

(56) References Cited

U.S. PATENT DOCUMENTS

| | | |
|---|---|---|
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,778,995 B1 | 8/2004 | Gallivan |
| 6,785,679 B1 | 8/2004 | Dane et al. |
| 6,789,230 B2 | 9/2004 | Katariya et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,826,724 B1 | 11/2004 | Shimada et al. |
| 6,841,321 B2 | 1/2005 | Matsumoto et al. |
| 6,847,966 B1 | 1/2005 | Sommer et al. |
| 6,862,710 B1 | 3/2005 | Marchisio |
| 6,879,332 B2 | 4/2005 | Decombe |
| 6,880,132 B2 | 4/2005 | Uemura |
| 6,883,001 B2 | 4/2005 | Abe |
| 6,886,010 B2 | 4/2005 | Kostoff |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,976,207 B1 | 12/2005 | Rujan et al. |
| 6,978,419 B1 | 12/2005 | Kantrowitz |
| 6,990,238 B1 | 1/2006 | Saffer et al. |
| 6,993,517 B2 | 1/2006 | Naito et al. |
| 6,993,535 B2 | 1/2006 | Bolle et al. |
| 6,996,575 B2 | 2/2006 | Cox et al. |
| 7,003,551 B2 | 2/2006 | Malik |
| 7,146,361 B2 | 2/2006 | Broder et al. |
| 7,013,435 B2 | 3/2006 | Gallo et al. |
| 7,020,645 B2 | 3/2006 | Bisbee et al. |
| 7,039,856 B2 | 5/2006 | Peairs et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,117,432 B1 | 10/2006 | Shanahan et al. |
| 7,130,807 B1 | 10/2006 | Mikurak |
| 7,137,075 B2 | 11/2006 | Hoshito et al. |
| 7,139,739 B2 | 11/2006 | Agrafiotis et al. |
| 7,155,668 B2 | 12/2006 | Holland et al. |
| 7,158,957 B2 | 1/2007 | Joseph et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cassock |
| 7,209,949 B2 | 4/2007 | Mousseau et al. |
| 7,233,843 B2 | 6/2007 | Budhraja et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Dohono et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,688 B2 | 9/2008 | Matsuno et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 8,132,121 B2 | 10/2008 | Risch et al. |
| 7,457,948 B1 | 11/2008 | Bilicksa et al. |
| 7,472,110 B2 | 12/2008 | Achlioptas |
| 7,478,403 B1 | 1/2009 | Allavarpu |
| 7,490,092 B2 | 2/2009 | Morton et al. |
| 7,499,923 B2 | 3/2009 | Kawatani |
| 7,509,256 B2 | 3/2009 | Iwahashi et al. |
| 7,516,419 B2 | 4/2009 | Petro et al. |
| 7,519,565 B2 | 4/2009 | Prakash et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,603,628 B2 | 10/2009 | Park et al. |
| 7,607,083 B2 | 10/2009 | Gong et al. |
| 7,639,868 B1 | 12/2009 | Regli et al. |
| 7,640,219 B2 | 12/2009 | Perrizo |
| 7,647,345 B2 | 1/2010 | Trespess et al. |
| 7,668,376 B2 | 2/2010 | Lin et al. |
| 7,668,789 B1* | 2/2010 | Forman ............... G06N 99/005 706/12 |
| 7,698,167 B2 | 4/2010 | Batham et al. |
| 7,712,049 B2 | 5/2010 | Williams et al. |
| 7,716,223 B2 | 5/2010 | Haveliwala et al. |
| 7,730,425 B2 | 6/2010 | de los Reyes et al. |
| 7,743,059 B2 | 6/2010 | Chan et al. |
| 7,756,974 B2 | 7/2010 | Blumenau |
| 7,761,447 B2 | 7/2010 | Brill et al. |
| 7,801,841 B2 | 9/2010 | Mishra et al. |
| 7,831,928 B1 | 11/2010 | Rose et al. |
| 7,885,901 B2 | 2/2011 | Hull et al. |
| 7,899,274 B2 | 3/2011 | Baba et al. |
| 7,971,150 B2 | 6/2011 | Raschutti et al. |
| 7,984,014 B2 | 7/2011 | Song et al. |
| 8,010,466 B2 | 8/2011 | Patinkin |
| 8,010,534 B2 | 8/2011 | Roitblat |
| 8,032,409 B1 | 10/2011 | Mikurak |
| 8,060,259 B2 | 11/2011 | Budhraja et al. |
| 8,065,156 B2 | 11/2011 | Gazdzinski |
| 8,165,974 B2 | 4/2012 | Privault et al. |
| 8,275,773 B2 | 9/2012 | Donnelly et al. |
| 8,290,778 B2 | 10/2012 | Gazdzinski |
| 8,296,146 B2 | 10/2012 | Gazdzinski |
| 8,296,666 B2 | 10/2012 | Wright et al. |
| 8,311,344 B2 | 11/2012 | Dunlop et al. |
| 8,326,823 B2 | 12/2012 | Grandhi et al. |
| 8,381,122 B2 | 2/2013 | Louch et al. |
| 8,401,710 B2 | 3/2013 | Budhraja et al. |
| 8,515,946 B2 | 8/2013 | Marcucci et al. |
| 8,676,605 B2 | 3/2014 | Familant |
| 8,712,777 B1 | 4/2014 | Gazdzinski |
| 8,719,037 B2 | 5/2014 | Gazdzinski |
| 8,719,038 B1 | 5/2014 | Gazdzinski |
| 8,781,839 B1 | 7/2014 | Gazdzinski |
| 8,819,569 B2 | 8/2014 | SanGiovanni et al. |
| 9,015,633 B2 | 4/2015 | Takamura et al. |
| 2002/0002556 A1 | 1/2002 | Yoshida et al. |
| 2002/0032735 A1 | 3/2002 | Bumstein et al. |
| 2002/0055919 A1 | 5/2002 | Mikheev |
| 2002/0065912 A1 | 5/2002 | Catchpole et al. |
| 2002/0078044 A1 | 6/2002 | Song et al. |
| 2002/0078090 A1 | 6/2002 | Hwang et al. |
| 2002/0122543 A1 | 9/2002 | Rowen |
| 2002/0184193 A1 | 12/2002 | Cohen |
| 2003/0046311 A1 | 3/2003 | Baidya et al. |

(56) References Cited

U.S. PATENT DOCUMENTS

| | | |
|---|---|---|
| 2003/0084066 A1 | 5/2003 | Waterman et al. |
| 2003/0120651 A1 | 6/2003 | Bernstein et al. |
| 2003/0130991 A1 | 7/2003 | Reijerse et al. |
| 2005/0022106 A1 | 7/2003 | Kawai et al. |
| 2003/0172048 A1 | 9/2003 | Kauffman |
| 2003/0174179 A1 | 9/2003 | Suermondt et al. |
| 2004/0024739 A1 | 2/2004 | Copperman et al. |
| 2004/0024755 A1 | 2/2004 | Rickard |
| 2004/0034633 A1 | 2/2004 | Rickard |
| 2004/0083206 A1 | 4/2004 | Wu et al. |
| 2004/0133650 A1 | 7/2004 | Miloushev et al. |
| 2004/0181427 A1 | 9/2004 | Stobbs et al. |
| 2004/0205482 A1 | 10/2004 | Basu |
| 2004/0205578 A1 | 10/2004 | Wolf et al. |
| 2004/0215608 A1 | 10/2004 | Gourlay |
| 2004/0243556 A1 | 12/2004 | Ferrucci et al. |
| 2005/0025357 A1 | 2/2005 | Landwehr et al. |
| 2005/0091211 A1 | 4/2005 | Vernau et al. |
| 2005/0097435 A1 | 5/2005 | Prakash et al. |
| 2005/0171772 A1 | 8/2005 | Iwahashi et al. |
| 2005/0203924 A1 | 9/2005 | Rosenberg |
| 2005/0283473 A1 | 12/2005 | Rousso et al. |
| 2006/0008151 A1 | 1/2006 | Lin et al. |
| 2006/0012297 A1 | 1/2006 | Lee et al. |
| 2006/0021009 A1 | 1/2006 | Lunt |
| 2006/0053382 A1 | 3/2006 | Gardner et al. |
| 2006/0122974 A1 | 6/2006 | Perisic |
| 2006/0122997 A1 | 6/2006 | Lin |
| 2006/0164409 A1 | 7/2006 | Borchardt et al. |
| 2006/0242013 A1 | 10/2006 | Agarwal et al. |
| 2007/0043774 A1* | 2/2007 | Davis .......... G06K 9/6256 707/999.2 |
| 2007/0044032 A1 | 2/2007 | Mollitor et al. |
| 2007/0109297 A1 | 5/2007 | Borchardt et al. |
| 2007/0112758 A1 | 5/2007 | Livaditis |
| 2007/0150801 A1 | 6/2007 | Chidlovskii et al. |
| 2007/0214133 A1 | 9/2007 | Liberty et al. |
| 2009/0125505 A1 | 11/2007 | Bhalotia et al. |
| 2007/0288445 A1 | 12/2007 | Kraftsow |
| 2008/0005081 A1 | 1/2008 | Green |
| 2008/0040302 A1* | 2/2008 | Perrizo .......... G06F 17/30598 706/20 |
| 2008/0109762 A1 | 5/2008 | Hundal et al. |
| 2008/0140643 A1 | 6/2008 | Ismalon |
| 2008/0162478 A1 | 7/2008 | Pugh et al. |
| 2008/0183855 A1 | 7/2008 | Agarwal et al. |
| 2008/0189273 A1 | 8/2008 | Kraftsow |
| 2008/0215427 A1 | 9/2008 | Kawada et al. |
| 2008/0228675 A1 | 9/2008 | Duffy et al. |
| 2008/0249999 A1 | 10/2008 | Renders et al. |
| 2009/0018995 A1 | 1/2009 | Chidlovskii et al. |
| 2009/0041329 A1 | 2/2009 | Nordell et al. |
| 2009/0043797 A1 | 2/2009 | Dorie |
| 2009/0049017 A1 | 2/2009 | Gross |
| 2007/0020642 A1 | 4/2009 | Deng et al. |
| 2009/0097733 A1 | 4/2009 | Hero et al. |
| 2009/0106239 A1 | 4/2009 | Getner et al. |
| 2009/0222444 A1 | 9/2009 | Chowdhury et al. |
| 2009/0228499 A1 | 9/2009 | Schmidtle et al. |
| 2009/0228811 A1 | 9/2009 | Adams et al. |
| 2009/0259622 A1* | 10/2009 | Kolz .......... G06F 17/30327 707/999.003 |
| 2009/0265631 A1 | 10/2009 | Sigurbjornsson et al. |
| 2009/0307213 A1 | 12/2009 | Deng et al. |
| 2010/0076857 A1 | 3/2010 | Deo et al. |
| 2010/0100539 A1 | 4/2010 | Davis et al. |
| 2010/0198802 A1 | 8/2010 | Kraftsow |
| 2010/0250477 A1 | 9/2010 | Yadav |
| 2010/0262571 A1 | 10/2010 | Schmidtler et al. |
| 2010/0268661 A1 | 10/2010 | Levy et al. |
| 2010/0312725 A1 | 12/2010 | Privault et al. |
| 2011/0016118 A1 | 1/2011 | Edala et al. |
| 2012/0124034 A1 | 5/2012 | Jing et al. |

FOREIGN PATENT DOCUMENTS

| | | |
|---|---|---|
| EP | 1049030 | 11/2000 |
| WO | 200067162 | 11/2000 |
| WO | 2003052627 | 6/2003 |
| WO | 2003060766 | 7/2003 |
| WO | 2006008733 | 7/2004 |
| WO | 2005073881 | 8/2005 |

OTHER PUBLICATIONS

Anna Sachinopoulou, "Multidimensional Visualization," Technical Research Centre of Finland, ESPOO 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).

Baeza-Yates et al., "Modern Information Retrieval," Ch. 2 "Modeling," Modem Information Retrieval, Harlow: Addison-Wesley, Great Britain 1999, pp. 18-71 (1999).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, IS.

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Boukhelifa et al., "A Model and Software System for Coordinated and Multiple Views in Exploratory Visualization," Information Visualization, No. 2, pp. 258-269, GB (2003).

C. Yip Chung et al., "Thematic Mapping-From Unstructured Documents to Taxonomies," CIKM'02, Nov. 4-9, 2002, pp. 608-610, ACM, McLean, Virginia, USA (Nov. 4, 2002).

Chen An et al., "Fuzzy Concept Graph and Application in Web Document Clustering," IEEE, pp. 101-106 (2001).

Davison et al., "Brute Force Estimation of the Number of Human Genes Using EST Clustering as a Measure," IBM Journal of Research & Development, vol. 45, pp. 439-447 (May 2001).

Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190, Sep. 18, 1996—SE.

Eades et al., "Orthogonal Grid Drawing of Clustered Graphs," Department of Computer Science, the University of Newcastle, Australia, Technical Report 96-04, [Online] 1996, Retrieved from the intenet: URL:http://citeseer.ist.psu.edu/eades96ort hogonal.ht.

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, N.

F. Can, Incremental Clustering for Dynamic Information Processing: ACM Transactions on Information Systems, ACM, New York, NY, US, vol. 11, No. 2, pp. 143-164, XP-002308022 (Apr. 1993).

Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).

http://em-ntserver.unl.edu/Math/mathweb/vecors/vectors.html © 1997.

Inxight VizServer, "Speeds and Simplifies the Exploration and Sharing of Information", www.inxight.com/products/vizserver, copyright 2005.

Jain et al., "Data Clustering: A Review," ACM Computing Surveys, vol. 31, No. 3, Sep. 1999, pp. 264-323, New York, NY, USA (Sep. 1999).

James Osborn et al., "JUSTICE: A Jidicial Search Tool Using Intelligent Cencept Extraction," Department of Computer Science and Software Engineering, University of Melbourne, Australia, ICAIL-99, 1999, pp. 173-181, ACM (1999).

(56) References Cited

OTHER PUBLICATIONS

Jiang Linhui, "K-Mean Algorithm: Iterative Partitioning Clustering Algorithm," http://www.cs.regina.cat-linhui/K.sub.--mean.sub.--algorithm.html, (2001) Computer Science Department, University of Regina, Saskatchewan, Canada (2001).

Kanungo et al., "The Analysis of a Simple K-Means Clustering Algorithm," pp. 100-109, Proc 16th annual symposium of computational geometry (May 2000).

S.S. Weng, C.K. Liu, "Using text classification and multiple concepts to answer e-mails." Expert Systems with Applications, 26 (2004), pp. 529-543.

Slaney, M., et al., "Multimedia Edges: Finding Hierarchy in all Dimensions" Proc. 9-th ACM Intl. Conf. on Multimedia, pp. 29-40, ISBN. 1-58113-394-4, Sep. 30, 2001, XP002295016 Ottawa (Sep. 3, 2001).

Strehl et al., "Cluster Ensembles-A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

Sullivan, Dan., "Document Warehousing and Text Mining: Techniques for Improving Business Operations, Marketing and Sales," Ch. 1-3, John Wiley & Sons, New York, NY (2001).

V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

Ryall et al., "An Interactive Constraint-Based System for Drawing Graphs," UIST '97 Proceedings of the 10th Annual ACM Symposium on User Interface Software and Technology, pp. 97-104 (1997).

O'Neill et al., "DISCO: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.

McNee, "Meeting User Information Needs in Recommender Systems," Ph.D. Dissertation, University of Minnesota-Twin Cities, Jun. 2006.

Kawano, Hiroyuki., "Overview of Mondou Web Search Engine Using Text Mining and Information Visualizing Technologies," IEEE, 2001, pp. 234-241.

Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).

Kohonen, T., "Self-Organizing Maps," Ch. 1-2, Springer-Verlag (3rd ed.) (2001).

Kurimo M., "Fast Latent Semantic Indexing of Spoken Documents by Using Self-Organizing Maps" IEEE International Conference on Accoustics, Speech, and Signal Processing, vol. 6, pp. 2425-2428 (Jun. 2000).

Lam et al., "A Sliding Window Technique for Word Recognition," SPIE, vol. 2422, pp. 38-46, Center of Excellence for Document Analysis and Recognition, State University of New Yrok at Baffalo, NY, USA (1995).

Lio et al., "Funding Pathogenicity Islands and Gene Transfer Events in Genome Data," Bioinformatics, vol. 16, pp. 932-940, Department of Zoology, University of Cambridge, UK (Jan. 25, 2000).

Artero et al., "Viz3D: Effective Exploratory Visualization of Large Multidimensional Data Sets," IEEE Computer Graphics and Image Processing, pp. 340-347 (Oct. 20, 2004).

Magarshak, Greg., Theory & Practice. Issue 01. May 17, 2000. http://www.flipcode.com/articles/tp.sub.--issue01-pf.shtml (May 17, 2000).

Maria Cristin Ferreira de Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).

Rauber et al., "Text Mining in the SOMLib Digital Library System: The Representation of Topics and Genres," Applied Intelligence 18, pp. 271-293, 2003 Kluwer Academic Publishers (2003).

Miller et al., "Topic Islands: A Wavelet Based Text Visualization System," Proceedings of the IEEE Visualization Conference. 1998, pp. 189-196.

North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).

Shuldberg et al., "Distilling Information from Text: The EDS TemplateFiller System," Journal of the American Society for Information Science, vol. 44, pp. 493-507 (1993).

Pelleg et al., "Accelerating Exact K-Means Algorithms With Geometric Reasoning," pp. 277-281, Conf on Knowledge Discovery in Data, Proc fifth ACM SIGKDD (1999).

R.E. Horn, "Communication Units, Morphology, and Syntax," Visual Language: Global Communication for the 21st Century, 1998, Ch. 3, pp. 51-92, MacroVU Press, Bainbridge Island, Washington, USA.

Paul N. Bennett et al., Probabilistic Combination of Text Classifiers Using Reliability Indicators, 2002, ACM, 8 pages.

DeLoura et al., Game Programming Gems 2, Charles River Media, Inc., pp. 182-190, 2001.

Liu et al. "Robust Multi-Class Transdructive learning with graphs", Jun. 2009.

Salton G. et al., "Extended Boolean Information Retrieval" Communications of the Association for Computing Machinery, ACM, New York, NY, US., vol. 26, p. 12, Nov. 1, 1983, pig1022-1036, XP000670417.

Cutting, Douglass R., et al. "Scatter/gather: A cluster-based approach to browsing large document collections." Proceedings of the 15th annual international ACM SIGIR conference on Research and development in information retrieval. ACM, 1992.

* cited by examiner

50

100 ing. Multiple pass review requires a priori project-specific knowledge engineering, which is only useful for the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

COMPUTER-IMPLEMENTED SYSTEM AND METHOD FOR INCLUSION-BASED ELECTRONICALLY STORED INFORMATION ITEM CLUSTER VISUAL REPRESENTATION

CROSS-REFERENCE TO RELATED APPLICATION

This patent application is a continuation of commonly-assigned U.S. Pat. No. 9,542,483, issued Jan. 10, 2017; which is a continuation of U.S. Pat. No. 8,713,018, issued Apr. 29, 2014, which claims priority under 35 U.S.C. § 119(e) to U.S. Provisional Patent Application, Ser. No. 61/229,216, filed Jul. 28, 2009, and U.S. Provisional Patent Application, Ser. No. 61/236,490, filed Aug. 24, 2009, the disclosures of which are incorporated by reference.

FIELD

This application relates in general to using electronically stored information as a reference point and, in particular, to a computer-implemented system and method for inclusion-based electronically stored information item cluster visual representation.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence.

During discovery, document review can potentially affect the outcome of the underlying legal matter, so consistent and accurate results are crucial. Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, classification categories, and review techniques.

Currently, with the increasingly widespread movement to electronically stored information (ESI), manual document review is no longer practicable. The often exponential growth of ESI exceeds the bounds reasonable for conventional manual human document review and underscores the need for computer-assisted ESI review tools.

Conventional ESI review tools have proven inadequate to providing efficient, accurate, and consistent results. For example, DiscoverReady LLC, a Delaware limited liability company, custom programs ESI review tools, which conduct semi-automated document review through multiple passes over a document set in ESI form. During the first pass, documents are grouped by category and basic codes are assigned. Subsequent passes refine and further assign codings. Multiple pass review requires a priori project-specific knowledge engineering, which is only useful for the single

SUMMARY

Document review efficiency can be increased by identifying relationships between reference ESI and uncoded ESI and providing a suggestion for classification based on the relationships. The reference ESI and uncoded ESI are clustered based on a similarity of the ESI. The clusters and the relationship between the uncoded ESI and reference ESI within the clusters are visually depicted. The visual relationship of the uncoded ESI and reference ESI provide a suggestion regarding classification for the uncoded ESI.

In one embodiment, a computer-implemented system and method for inclusion-based electronically stored information item cluster visual representation is provided. A set of reference electronically stored information items is maintained. A subset of the electronically stored information items is selected from the set, each of the reference electronically stored information items in the subset associated with a classification code, each of the classification codes associated with a visual representation different from the visual representations of the remaining classification codes. The subset is combined with a set of uncoded electronically stored information items, each of the uncoded electronically stored information items associated with a visual representation different from the visual representations of the classification codes. The combined electronically stored information items are grouped into clusters. Each of the clusters is visually represented, including displaying the visual representation associated with the code of each of the reference electronically stored information items in that cluster and the visual representation associated with each of the uncoded electronically stored information item in that cluster.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The ever-increasing volume of ESI underlies the need for automating document review for improved consistency and throughput. Previously coded ESI, known as reference ESI, offer knowledge gleaned from earlier work in similar legal projects, as well as a reference point for classifying uncoded ESI.

Providing Suggestions Using Reference Documents

Reference ESI is previously classified by content and can be used to influence classification of uncoded, that is unclassified, ESI. Specifically, relationships between the uncoded ESI and the reference ESI can be visually depicted to provide suggestions, for instance to a human reviewer, for classifying the visually-proximal uncoded ESI.

Figure 1:
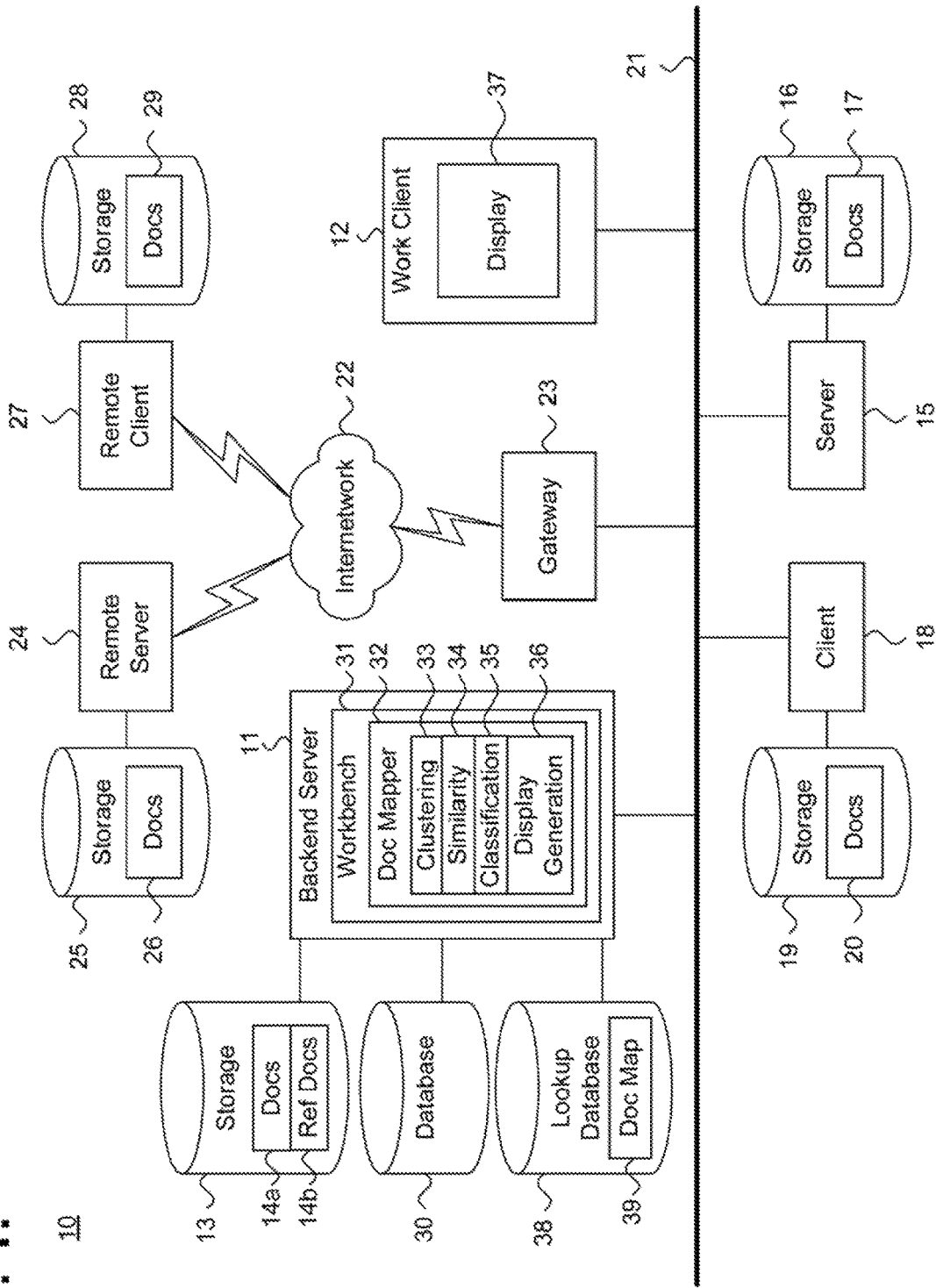
FIG. 1 is a block diagram showing a system for displaying relationships between electronically stored information to provide classification suggestions via inclusion, in accordance with one embodiment.

Complete ESI review requires a support environment within which classification can be performed. FIG. 1 is a block diagram showing a system 10 for displaying relationships between electronically stored information to provide classification suggestions via inclusion, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14a, such as uncoded documents, in the form of structured or unstructured data, a database 30 for maintaining information about the documents, and a lookup database 38 for storing many-to-many mappings 39 between documents and document features, such as concepts. The storage device 13 also stores reference documents 14b, which can provide a training set of trusted and known results for use in guiding ESI classification. The reference documents 14b are each associated with an assigned classification code and considered as classified or coded. Hereinafter, the terms "classified" and "coded" are used interchangeably with the same intended meaning, unless otherwise indicated. A set of reference documents can be hand-selected or automatically selected through guided review, which is further discussed below. Additionally, the set of reference documents can be predetermined or can be generated dynamically, as uncoded documents are classified and subsequently added to the set of reference documents.

The backend server 11 is coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient document scoring and clustering of uncoded documents and reference documents, such as described in commonly-assigned U.S. Pat. No. 7,610,313, the disclosure of which is incorporated by reference. Clusters of uncoded documents 14a and reference documents 14b are formed and organized along vectors, known as spines, based on a similarity of the clusters. The similarity can be expressed in terms of distance. Document clustering is further discussed below with reference to FIG. 4. The classifier 35 provides a machine-generated suggestion and confidence level for classification of selected uncoded documents 14b, clusters, or spines, as further described below with reference to FIG. 7.

Figure 2:
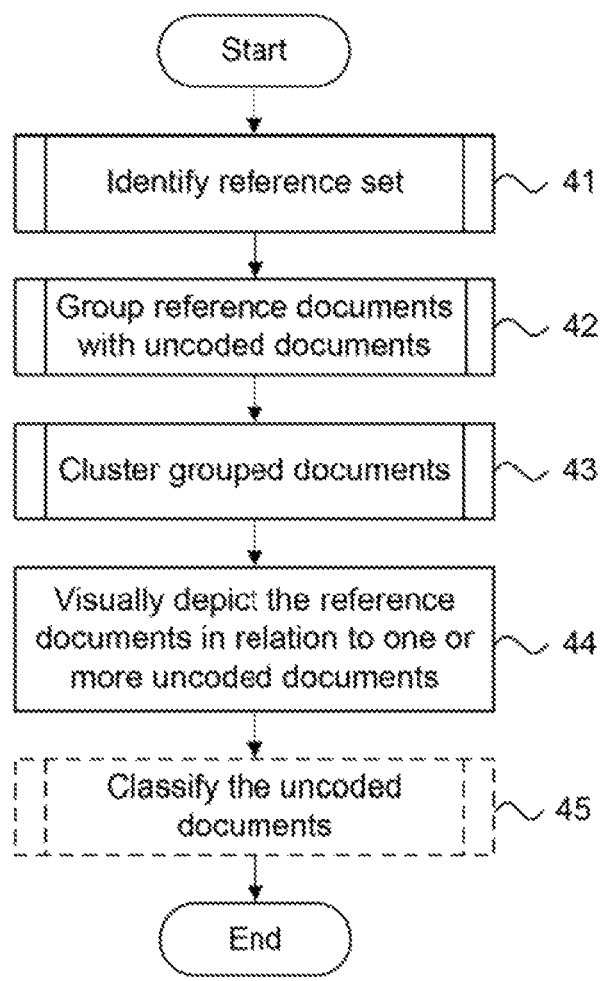
FIG. 2 is a process flow diagram showing a method for displaying relationships between electronically stored information to provide classification suggestions via inclusion, in accordance with one embodiment.

The display generator 36 arranges the clusters and spines in thematic relationships in a two-dimensional visual display space, as further described below beginning with reference to FIG. 2. Once generated, the visual display space is transmitted to a work client 12 by the backend server 11 via the document mapper 32 for presenting to a reviewer on a display 37. The reviewer can include an individual person who is assigned to review and classify one or more uncoded documents by designating a code. Hereinafter, the terms "reviewer" and "custodian" are used interchangeably with the same intended meaning, unless otherwise indicated. Other types of reviewers are possible, including machine-implemented reviewers.

The document mapper 32 operates on uncoded documents 14a, which can be retrieved from the storage 13, as well as from a plurality of local and remote sources. As well, the local and remote sources can also store the reference documents 14b. The local sources include documents 17 maintained in a storage device 16 coupled to a local server 15 and documents 20 maintained in a storage device 19 coupled to a local client 18. The local server 15 and local client 18 are interconnected to the backend server 11 and the work client 12 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27. Other document sources, either local or remote, are possible.

The individual documents 14a, 14b, 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Outlook Express products, licensed by Microsoft Corporation, Redmond, Wash. The database can be an SQL-based relational database, such as the Oracle database management system, Release 8, licensed by Oracle Corporation, Redwood Shores, Calif.

The individual documents 17, 20, 26, 29 can be designated and stored as uncoded documents or reference documents. One or more of the uncoded documents can be selected for a document review project and stored as a document corpus, as described infra. The reference documents are initially uncoded documents that can be selected from the corpus or other source of uncoded documents, and subsequently classified. The reference documents can assist in providing suggestions for classification of the remaining uncoded documents in the corpus based on visual relationships between the uncoded documents and reference documents. In a further embodiment, the reference documents can provide suggestions for classifying uncoded documents in a different corpus. In yet a further embodiment, the reference documents can be used as a training set to form machine-generated suggestions for classifying uncoded documents, as further described below with reference to FIG. 8.

The document corpus for a document review project can be divided into subsets of uncoded documents, which are each provided to a particular reviewer as an assignment. To maintain consistency, the same classification codes can be used across all assignments in the document review project. Alternatively, the classification codes can be different for each assignment. The classification codes can be determined using taxonomy generation, during which a list of classification codes can be provided by a reviewer or determined automatically. For purposes of legal discovery, the list of classification codes can include "privileged," "responsive," or "non-responsive;" however, other classification codes are possible. A "privileged" document contains information that is protected by a privilege, meaning that the document should not be disclosed or "produced" to an opposing party. Disclosing a "privileged" document can result in unintentional waivers of the subject matter disclosed. A "responsive" document contains information that is related to a legal matter on which the document review project is based and a "non-responsive" document includes information that is not related to the legal matter.

The system 10 includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Identifying relationships between the reference documents and uncoded documents includes clustering. FIG. 2 is a process flow diagram showing a method 40 for displaying relationships between electronically stored information to provide classification suggestions via inclusion, in accordance with one embodiment. A subset of reference documents is identified and selected (block 41) from a representative set of reference documents. The subset of reference documents can be predefined, arbitrary, or specifically selected, as discussed further below with reference to FIG. 3. Upon identification, the reference document subset is grouped with uncoded documents (block 42). The uncoded documents can include all uncoded documents in an assignment or in a corpus. The grouped documents, including uncoded and reference documents are organized into clusters (block 43). Clustering of the documents is discussed further below with reference to FIG. 4.

Once formed, the clusters can be displayed to visually depict relationships (block 44) between the uncoded documents and the reference documents. The relationships can provide a suggestion, which can be used by an individual reviewer for classifying one or more of the uncoded documents, clusters, or spines. Based on the relationships, the reviewer can classify the uncoded documents, clusters, or spines by assigning a classification code, which can represent a relevancy of the uncoded document to the document review project. Further, machine classification can provide a suggestion for classification, including a classification code, based on a calculated confidence level (block 45). Classifying uncoded documents is further discussed below with reference to FIG. 7.

Identifying a Set and Subset of Reference Documents

Prior to clustering, the uncoded documents and reference documents are obtained. The reference documents used for clustering can include a particular subset of reference documents, which are selected from a general set of reference documents. Alternatively, the entire set of reference documents can be clustered with the uncoded documents. The set of reference documents is representative of the document corpus for a document review project in which data organization or classification is desired. The reference document set can be previously defined and maintained for related document review projects or can be specifically generated for each review project. A predefined reference set provides knowledge previously obtained during the related document review project to increase efficiency, accuracy, and consistency. Reference sets newly generated for each review project can include arbitrary or customized reference sets that are determined by a reviewer or a machine.

The set of reference documents can be generated during guided review, which assists a reviewer in building a reference document set. During guided review, the uncoded documents that are dissimilar to the other uncoded documents are identified based on a similarity threshold. Other methods for determining dissimilarity are possible. Identifying a set of dissimilar documents provides a group of uncoded documents that is representative of the corpus for the document review project. Each identified dissimilar document is then classified by assigning a particular classification code based on the content of the document to collectively generate a set of reference documents. Guided review can be performed by a reviewer, a machine, or a combination of the reviewer and machine.

Other methods for generating a reference document set for a document review project using guided review are possible, including clustering. For example, a set of uncoded documents to be classified is clustered, as described in commonly-assigned U.S. Pat. No. 7,610,313, the disclosure of which is incorporated by reference. A plurality of the clustered uncoded documents are selected based on selection criteria, such as cluster centers or sample clusters. The cluster centers can be used to identify uncoded documents in a cluster that are most similar or dissimilar to the cluster center. The identified uncoded documents are then selected for classification by assigning classification codes. After classification, the documents represent a reference set. In a further embodiment, sample clusters can be used to generate a reference document set by selecting one or more sample clusters based on cluster relation criteria, such as size, content, similarity, or dissimilarity. The uncoded documents in the selected sample clusters are then assigned classification codes. The classified documents represent a document reference set for the document review project. Other methods for selecting documents for use as a reference set are possible.

Figure 3:
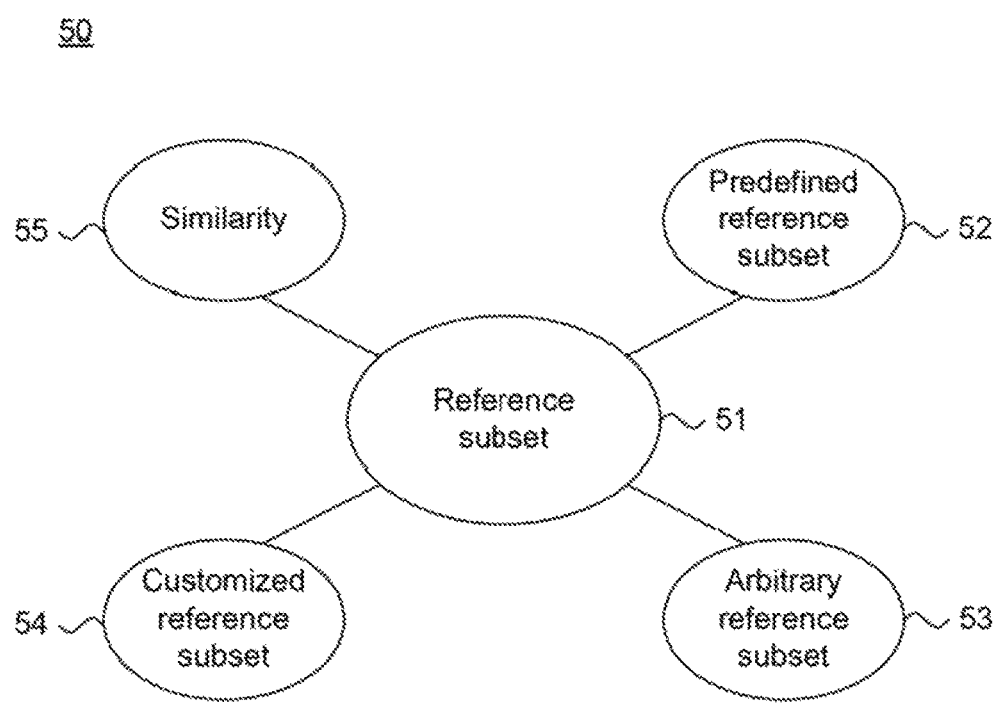
FIG. 3 is a block diagram showing, by way of example, measures for selecting reference document subsets for use in the method of FIG. 2.

Once generated, a subset of reference documents is selected from the reference document set for clustering with uncoded documents. FIG. 3 is a block diagram showing, by way of example, measures 50 for selecting reference document subsets 51 for use in the method of FIG. 2. A reference document subset 51 includes one or more reference documents selected from a set of reference documents associated with a document review project for use in clustering with uncoded documents. The reference document subset can be predefined 52, customized 54, selected arbitrarily 53, or based on similarity 55.

A subset of predefined reference documents 52 can be selected from a reference set, which is associated with another document review project that is related to the current document review project. An arbitrary reference subset 53 includes reference documents randomly selected from a reference set, which can be predefined or newly generated for the current document review project or a related document review project. A customized reference subset 54 includes reference documents specifically selected from a current or related reference set based on criteria, such as reviewer preference, classification category, document source, content, and review project. Other criteria are possible. The number of reference documents in a subset can be determined automatically or by a reviewer based on reference factors, such as a size of the document review project, an average size of the assignments, types of classification codes, and a number of reference documents associated with each classification code. Other reference factors are possible. In a further embodiment, the reference document subset can include more than one occurrence of a reference document. Other types of reference document subsets and methods for selecting the reference document subsets are possible.

Forming Clusters

Once identified, the reference document subset can be used for clustering with uncoded documents from a corpus associated with a particular document review project. The corpus of uncoded documents for a review project can be divided into assignments using assignment criteria, such as custodian or source of the uncoded document, content, document type, and date. Other criteria are possible. In one embodiment, each assignment is assigned to an individual reviewer for analysis. The assignments can be separately clustered with the reference document subset or alternatively, all of the uncoded documents in the corpus can be clustered with the reference document subset. The content of each uncoded document within the corpus can be converted into a set of tokens, which are word-level or character-level n-grams, raw terms, concepts, or entities. Other tokens are possible.

An n-gram is a predetermined number of items selected from a source. The items can include syllables, letters, or words, as well as other items. A raw term is a term that has not been processed or manipulated. Concepts typically include nouns and noun phrases obtained through part-of-speech tagging that have a common semantic meaning. Entities further refine nouns and noun phrases into people, places, and things, such as meetings, animals, relationships, and various other objects. Entities can be extracted using entity extraction techniques known in the field. Clustering of the uncoded documents can be based on cluster criteria, such as the similarity of tokens, including n-grams, raw terms, concepts, entities, email addresses, or other metadata.

Figure 4:
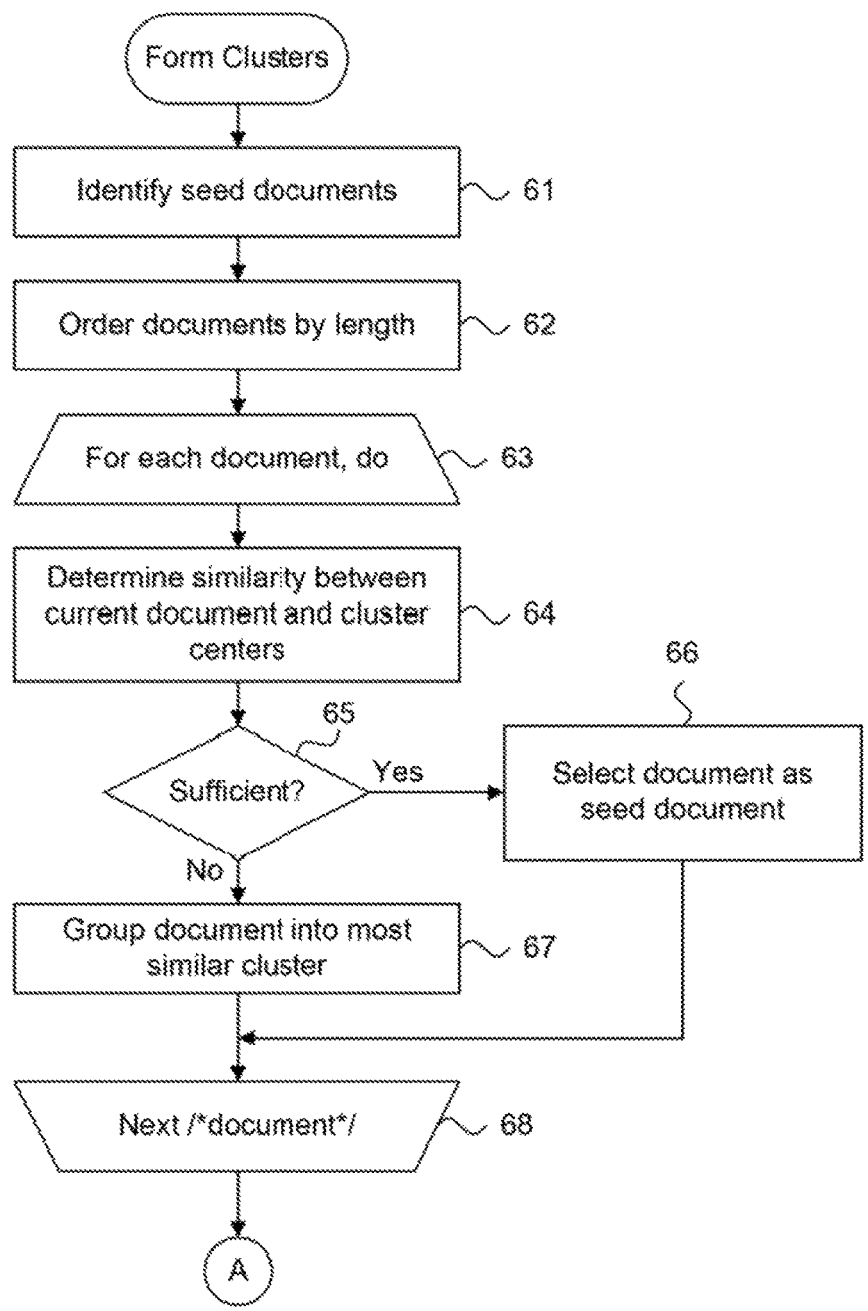
FIG. 4 is a process flow diagram showing, by way of example, a method for forming clusters for use in the method of FIG. 2.
Figure 4:
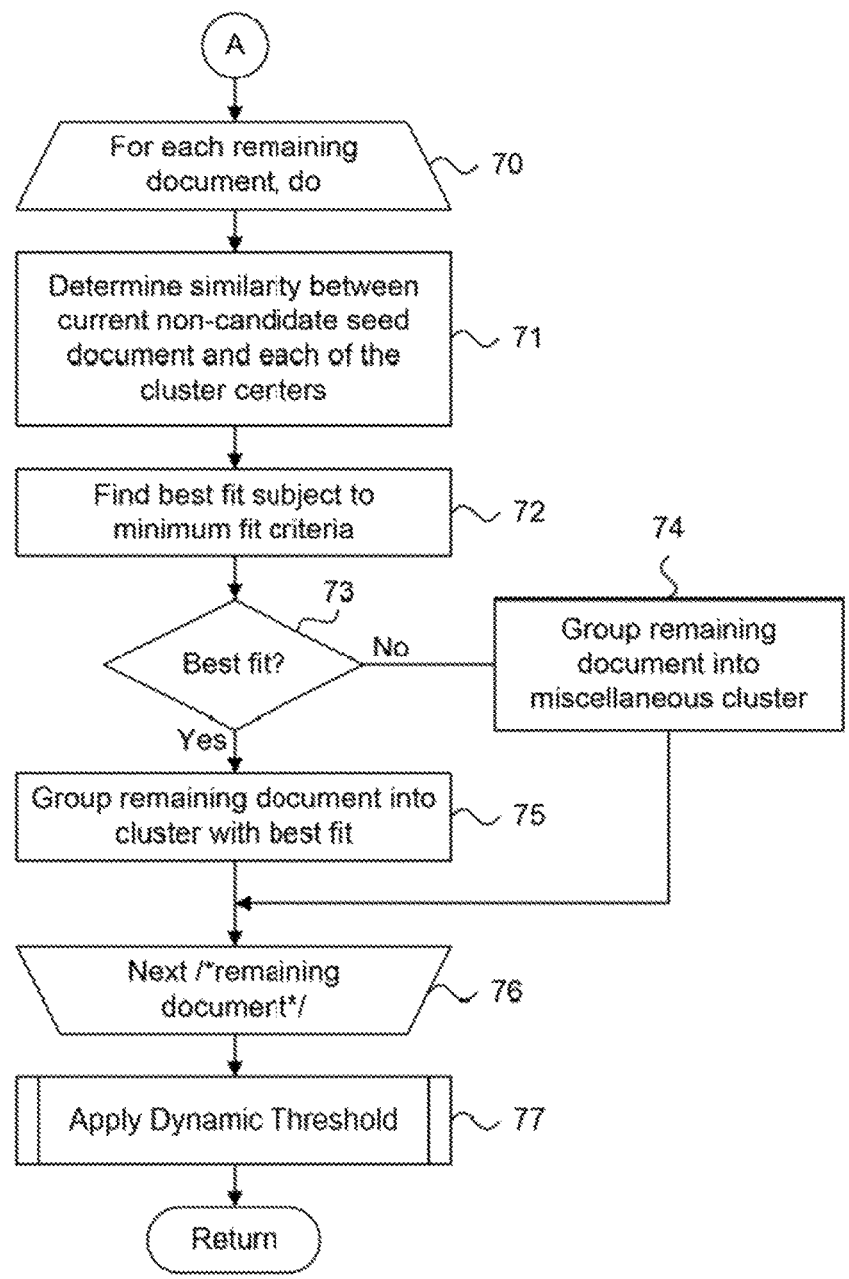

Clustering provides groupings of related uncoded documents and reference documents. FIG. 4 is a flow diagram showing a routine 60 for forming clusters for use in the method 40 of FIG. 2. The purpose of this routine is to use score vectors associated with the documents, including uncoded and reference documents, to form clusters based on relative similarity. Hereinafter, the term "document" is intended to include uncoded documents and reference documents selected for clustering, unless otherwise indicated. The score vector associated with each document includes a set of paired values for tokens identified in that document and weights, which are based on scores. The score vector is generated by scoring the tokens extracted from each uncoded document and reference document, as described in commonly-assigned U.S. Pat. No. 7,610,313, the disclosure of which is incorporated by reference.

As an initial step for generating score vectors, each token within a document is individually scored. Next, a normalized score vector is created for the document by identifying paired values, consisting of a token occurring in that document and the scores for that token. The paired values are ordered along a vector to generate the score vector. The paired values can be ordered based on the tokens, including concept or frequency, as well as other factors. For example, assume a normalized score vector for a first document A is $\vec{S}_A = \{(5, 0.5), (120, 0.75)\}$ and a normalized score vector for another document B is $\vec{S}_B = \{(3, 0.4), (5, 0.75), (47, 0.15)\}$. Document A has scores corresponding to tokens '5' and '120' and Document B has scores corresponding to tokens '3,' '5' and '47.' Thus, these documents only have token '5' in common. Once generated, the score vectors can be compared to determine similarity or dissimilarity between the corresponding documents during clustering.

The routine for forming clusters of documents, including uncoded documents and reference documents, proceeds in two phases. During the first phase (blocks 63-68), the documents are evaluated to identify a set of seed documents, which can be used to form new clusters. During the second phase (blocks 70-76), any documents not previously placed are evaluated and grouped into the existing clusters based on a best-fit criterion.

Initially, a single cluster is generated with one or more documents as seed documents and additional clusters of documents are added, if necessary. Each cluster is represented by a cluster center that is associated with a score vector, which is representative of the tokens in all the documents for that cluster. In the following discussion relating to FIG. 4, the tokens include concepts. However, other tokens are possible, as described supra. The cluster center score vector can be generated by comparing the score vectors for the individual documents in the cluster and identifying the most common concepts shared by the documents. The most common concepts and associated weights are ordered along the cluster center score vector. Cluster centers and thus, cluster center score vectors may continually change due to the addition and removal of documents during clustering.

During clustering, the documents are identified (block 61) and ordered by length (block 62). The documents can include all reference documents in a subset and one or more assignments of uncoded documents. Each document is then processed in an iterative processing loop (blocks 63-68) as follows. The similarity between each document and a center of each cluster is determined (block 64) as the cosine (cos) σ of the score vectors for the document and cluster being compared. The cos σ provides a measure of relative similarity or dissimilarity between tokens, including the concepts, in the documents and is equivalent to the inner products between the score vectors for the document and cluster center.

In the described embodiment, the cos σ is calculated in accordance with the equation:

$$\cos \sigma_{AB} = \frac{\langle \vec{S}_A \cdot \vec{S}_B \rangle}{|\vec{S}_A||\vec{S}_B|}$$

where $\cos \sigma_{AB}$ comprises the similarity metric between document A and cluster center B, $\vec{S}_A$ comprises a score vector for the document A, and $\vec{S}_B$ comprises a score vector for the cluster center B. Other forms of determining similarity using a distance metric are feasible, as would be recognized by one skilled in the art. An example includes using Euclidean distance.

Only those documents that are sufficiently distinct from all cluster centers (block 65) are selected as seed documents for forming new clusters (block 66). If the document being compared is not sufficiently distinct (block 65), the document is then grouped into a cluster with the most similar cluster center (block 67). Processing continues with the next document (block 68).

In the second phase, each document not previously placed is iteratively processed in an iterative processing loop (blocks 70-76) as follows. Again, the similarity between each remaining document and each of the cluster centers is determined based on a distance (block 71), such as the cos σ of the normalized score vectors for each of the remaining documents and the cluster centers. A best fit between a remaining document and a cluster center can be found subject to a minimum fit criterion (block 72). In the described embodiment, a minimum fit criterion of 0.25 is used, although other minimum fit criteria could be used. If a best fit is found (block 73), the remaining document is grouped into the cluster having the best fit (block 75). Otherwise, the remaining document is grouped into a miscellaneous cluster (block 74). Processing continues with the next remaining document (block 76). Finally, a dynamic threshold can be applied to each cluster (block 77) to evaluate and strengthen document membership in a particular cluster. The dynamic threshold is applied based on a cluster-by-cluster basis, as described in commonly-assigned U.S. Pat. No. 7,610,313, the disclosure of which is incorporated by reference. The routine then returns. Other methods and processes for forming clusters are possible.

Displaying the Reference Documents

Once formed, the clusters of documents can be can be organized to generate spines of thematically related clusters, as described in commonly-assigned U.S. Pat. No. 7,271,804, the disclosure of which is incorporated by reference. Each spine includes those clusters that share one or more tokens, such as concepts, which are placed along a vector. Also, the cluster spines can be positioned in relation to other cluster spines based on a theme shared by those cluster spines, as described in commonly-assigned U.S. Pat. No. 7,610,313, the disclosure of which is incorporated by reference. Each theme can include one or more concepts defining a semantic meaning. Organizing the clusters into spines and groups of cluster spines provides an individual reviewer with a display that presents the documents according to a theme while maximizing the number of relationships depicted between the documents.

Figure 5:
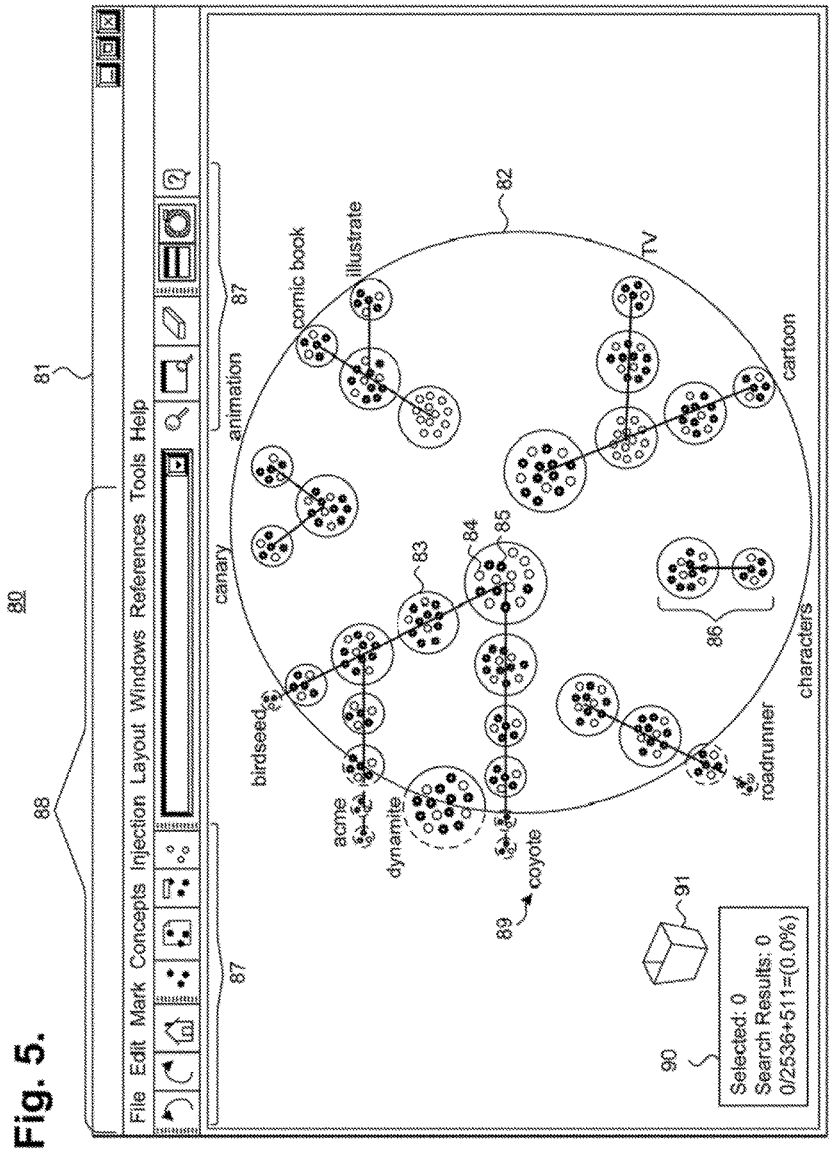
FIG. 5 is a screenshot showing, by way of example, a visual display of reference documents in relation to uncoded documents.

FIG. 5 is a screenshot 80 showing, by way of example, a visual display 81 of reference documents 85 in relation to uncoded documents 84. Clusters 83 can be located along a spine, which is a straight vector, based on a similarity of the documents 84, 85 in the clusters 83. Each cluster 83 is represented by a circle; however, other shapes, such as squares, rectangles, and triangles are possible, as described in U.S. Pat. No. 6,888,548, the disclosure of which is incorporated by reference. The uncoded documents 84 are each represented by a smaller circle within the clusters 83, while the reference documents 85 are each represented by a circle having a diamond shape within the boundaries of the circle. The reference documents 85 can be further represented by their assigned classification code. The classification codes can include "privileged," "responsive," and "non-responsive" codes, as well as other codes. Each group of reference documents associated with a particular classification code can be identified by a different color. For instance, "privileged" reference documents can be colored blue, while "non-responsive" reference documents are red and "responsive" reference documents are green. In a further embodiment, the reference documents for different classification codes can include different symbols. For example, "privileged" reference documents can be represented by a circle with an "X" in the center, while "non-responsive" reference documents can include a circle with striped lines and "responsive" reference documents can include a circle with dashed lines. Other classification representations for the reference documents are possible. Each cluster spine 86 is represented as a straight vector along which the clusters are placed.

The display 81 can be manipulated by an individual reviewer via a compass 82, which enables the reviewer to navigate, explore, and search the clusters 83 and spines 86 appearing within the compass 82, as further described in commonly-assigned U.S. Pat. No. 7,356,777, the disclosure of which is incorporated by reference. Visually, the compass 82 emphasizes clusters 83 located within the compass 82, while deemphasizing clusters 83 appearing outside of the compass 82.

Spine labels 89 appear outside of the compass 82 at an end of each cluster spine 86 to connect the outermost cluster of a cluster spine 86 to the closest point along the periphery of the compass 82. In one embodiment, the spine labels 89 are placed without overlap and circumferentially around the compass 82. Each spine label 89 corresponds to one or more concepts that most closely describe the cluster spines 86 appearing within the compass 82. Additionally, the cluster concepts for each of the spine labels 89 can appear in a concepts list (not shown) also provided in the display. Toolbar buttons 87 located at the top of the display 81 enable a user to execute specific commands for the composition of the spine groups displayed. A set of pull down menus 88 provide further control over the placement and manipulation of clusters 83 and cluster spines 86 within the display 81. Other types of controls and functions are possible.

A document guide 90 can be placed within the display 81. The document guide 90 can include a "Selected" field, a "Search Results" field, and details regarding the numbers of uncoded documents and reference documents provided in the display. The number of uncoded documents includes all uncoded documents selected for clustering, such as within a corpus of uncoded documents for a review project or within an assignment. The number of reference documents includes the reference document subset selected for clustering. The "Selected" field in the document guide 90 provides a number of documents within one or more clusters selected by the reviewer. The reviewer can select a cluster by "double clicking" the visual representation of that cluster using a mouse. The "Search Results" field provides a number of uncoded documents and reference documents that include a particular search term identified by the reviewer in a search query box 92.

In one embodiment, a garbage can 91 is provided to remove tokens, such as cluster concepts, from consideration in the current set of clusters 83. Removed cluster concepts prevent those concepts from affecting future clustering, as may occur when a reviewer considers a concept irrelevant to the clusters 83.

Figure 6A:
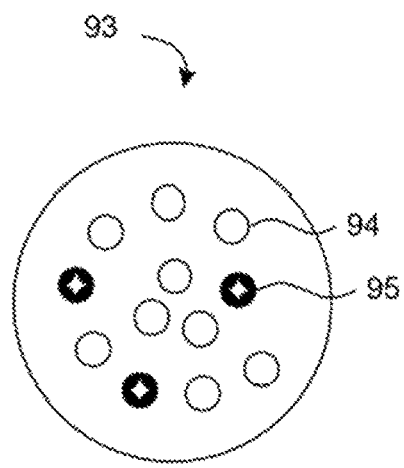
FIG. 6A is a block diagram showing, by way of example, a cluster with "privileged" reference documents and uncoded documents.

The display 81 provides a visual representation of the relationships between thematically-related documents, including the uncoded documents and reference documents. The uncoded documents and reference documents located within a cluster or spine can be compared based on characteristics, such as the assigned classification codes of the reference documents, a number of reference documents associated with each classification code, and a number of different classification codes to identify relationships between the uncoded documents and reference documents. The reviewer can use the displayed relationships as suggestions for classifying the uncoded documents. For example, FIG. 6A is a block diagram showing, by way of example, a cluster 93 with "privileged" reference documents 95 and uncoded documents 94. The cluster 93 includes nine uncoded documents 94 and three reference documents 95. Each reference document 95 is classified as "privileged." Accordingly, based on the number of "privileged" reference documents 95 present in the cluster 93, the absence of other classifications of reference documents, and the thematic relationship between the uncoded documents 94 and the "privileged" reference documents 95, the reviewer may be more inclined to review the uncoded documents 94 in that cluster 93 or to classify one or more of the uncoded documents 94 as "privileged" without review.

Figure 6B:
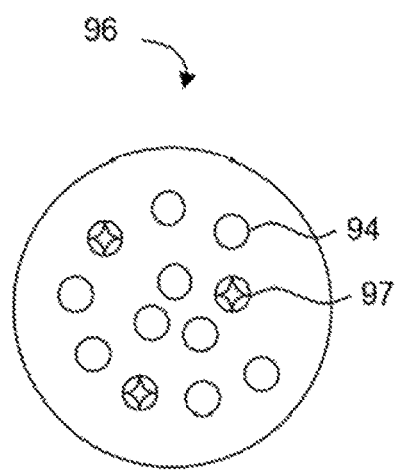
FIG. 6B is a block diagram showing, by way of example, a cluster with "non-responsive" reference documents and uncoded documents.

Alternatively, the three reference documents can be classified as "non-responsive," instead of "privileged" as in the previous example. FIG. 6B is a block diagram showing, by way of example, a cluster 96 with "non-responsive" reference documents 97 and uncoded documents 94. The cluster 96 includes nine uncoded documents 94 and three "non-responsive" documents 97. Since the uncoded documents 94 in the cluster are thematically related to the "non-responsive" reference documents 97, the reviewer may wish to assign a "non-responsive" code to one or more of the uncoded documents 94 without review, as they are most likely not relevant to the legal matter associated with the document review project. In making a decision to assign a code, such as "non-responsive," the reviewer can consider the number of "non-responsive" reference documents in the cluster, the presence or absence of other reference document classification codes, and the thematic relationship between the "non-responsive" reference documents and the uncoded documents. Thus, the presence of the three "non-responsive" reference documents 97 in the cluster provides a suggestion that the uncoded documents 94 may also be "non-responsive." Further, the label 89 associated with the spine 86 upon which the cluster is located can also be used to influence a suggestion.

Figure 6C:
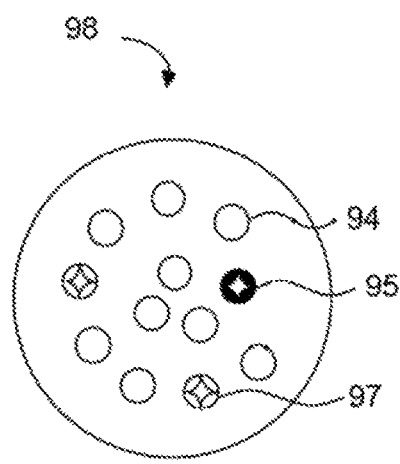
FIG. 6C is a block diagram showing, by way of example, a cluster with uncoded documents and a combination of differently classified reference documents.

A further example can include a cluster with combination of "privileged" and "non-responsive" reference documents. For example, FIG. 6C is a block diagram showing, by way of example, a cluster 98 with uncoded documents 94 and a combination of differently classified reference documents 95, 97. The cluster 98 can include one "privileged" reference document 95, two "non-responsive" reference documents 97, and nine uncoded documents 94. The "privileged" 95 and "non-responsive" 97 reference documents can be distinguished by different colors or shape, as well as other identifiers. The combination of "privileged" 95 and "non-responsive" 97 reference documents within the cluster 98 can suggest to a reviewer that the uncoded reference documents 94 should be reviewed before classification or that one or more uncoded reference documents 94 should be classified as "non-responsive" based on the higher number of "non-responsive" reference documents 97 in the cluster 98. In making a classification decision, the reviewer may consider the number of "privileged" reference documents 95 versus the number of "non-responsive" reference documents 97, as well as the thematic relationships between the uncoded documents 94 and the "privileged" 95 and "non-responsive" 97 reference documents. Additionally, the reviewer can identify the closest reference document to an uncoded document and assign the classification code of the closest reference document to the uncoded document. Other examples, classification codes, and combinations of classification codes are possible.

Additionally, the reference documents can also provide suggestions for classifying clusters and spines. The suggestions provided for classifying a cluster can include factors, such as a presence or absence of classified documents with different classification codes within the cluster and a quantity of the classified documents associated with each classification code in the cluster. The classification code assigned to the cluster is representative of the documents in that cluster and can be the same as or different from one or more classified documents within the cluster. Further, the suggestions provided for classifying a spine include factors, such as a presence or absence of classified documents with different classification codes within the clusters located along the spine and a quantity of the classified documents for each classification code. Other suggestions for classifying documents, clusters, and spines are possible.

Classifying Uncoded Documents

The display of relationships between the uncoded documents and reference documents provides suggestion to an individual reviewer. The suggestions can indicate a need for manual review of the uncoded documents, when review may be unnecessary, and hints for classifying the uncoded documents. Additional information can be generated to assist the reviewer in making classification decisions for the uncoded documents, such as a machine-generated confidence level associated with a suggested classification code, as described in common-assigned U.S. Pat. No. 8,635,225, issued on Jan. 21, 2014, the disclosure of which is incorporated by reference.

Figure 7:
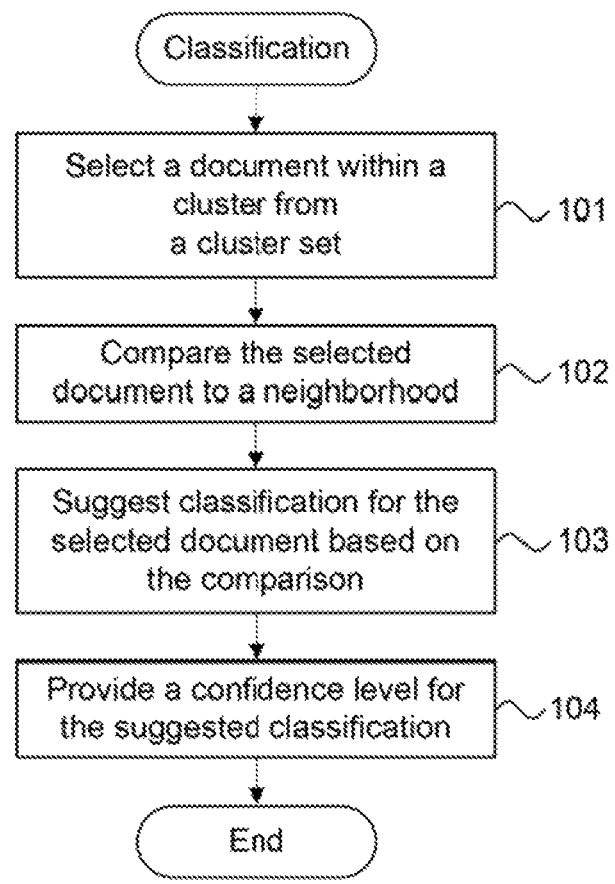
FIG. 7 is a process flow diagram showing, by way of example, a method for classifying uncoded documents for use in the method of FIG. 2.

The machine-generated suggestion for classification and associated confidence level can be determined by a classifier. FIG. 7 is a process flow diagram 100 showing, by way of example, a method for classifying uncoded documents by a classifier for use in the method of FIG. 2. An uncoded document is selected from a cluster within a cluster set (block 101) and compared to a neighborhood of x-reference documents (block 102), also located within the cluster, to identify those reference documents that are most relevant to the selected uncoded document. In a further embodiment, a machine-generated suggestion for classification and an associated confidence level can be provided for a cluster or spine by selecting and comparing the cluster or spine to a neighborhood of x-reference documents determined for the selected cluster or spine.

The neighborhood of x-reference documents is determined separately for each selected uncoded document and can include one or more reference documents within that cluster. During neighborhood generation, an x number of reference documents is first determined automatically or by an individual reviewer. Next, the x-number of reference documents nearest in distance to the selected uncoded document are identified. Finally, the identified x-number of reference documents are provided as the neighborhood for the selected uncoded document. In a further embodiment, the x-number of reference documents are defined for each classification code, rather than across all classification codes. Once generated, the x-number of reference documents in the neighborhood and the selected uncoded document are analyzed by the classifier to provide a machine-generated classification suggestion (block 103). A confidence level for the suggested classification is also provided (block 104).

The analysis of the selected uncoded document and x-number of reference documents can be based on one or more routines performed by the classifier, such as a nearest neighbor (NN) classifier. The routines for determining a suggested classification code include a minimum distance classification measure, also known as closest neighbor, minimum average distance classification measure, maximum count classification measure, and distance weighted maximum count classification measure. The minimum distance classification measure includes identifying a neighbor that is the closest distance to the selected uncoded document and assigning the classification code of the closest neighbor as the suggested classification code for the selected uncoded document. The closest neighbor is determined by comparing the score vectors for the selected uncoded document with each of the x-number of reference documents in the neighborhood as the cos σ to determine a distance metric. The distance metrics for the x-number of reference documents are compared to identify the reference document closest to the selected uncoded document as the closest neighbor.

The minimum average distance classification measure includes calculating an average distance of the reference documents in a cluster for each classification code. The classification code with the reference documents having the closest average distance to the selected uncoded document is assigned as the suggested classification code. The maximum count classification measure, also known as the voting classification measure, includes counting a number of reference documents within the cluster for each classification code and assigning a count or "vote" to the reference documents based on the assigned classification code. The classification code with the highest number of reference documents or "votes" is assigned to the selected uncoded document as the suggested classification. The distance weighted maximum count classification measure includes identifying a count of all reference documents within the cluster for each classification code and determining a distance between the selected uncoded document and each of the reference documents. Each count assigned to the reference documents is weighted based on the distance of the reference document from the selected uncoded document. The classification code with the highest count, after consideration of the weight, is assigned to the selected uncoded document as the suggested classification.

The machine-generated classification code is provided for the selected uncoded document with a confidence level, which can be presented as an absolute value or a percentage. Other confidence level measures are possible. The reviewer can use the suggested classification code and confidence level to assign a classification to the selected uncoded document. Alternatively, the x-NN classifier can automatically assign the suggested classification. In one embodiment, the x-NN classifier only assigns an uncoded document with the suggested classification code if the confidence level is above a threshold value, which can be set by the reviewer or the x-NN classifier.

Classification can also occur on a cluster or spine level. For instance, for cluster classification, a cluster is selected and a score vector for the center of the cluster is determined as described above with reference to FIG. 4. A neighborhood for the selected cluster is determined based on a distance metric. The x-number of reference documents that are closest to the cluster center can be selected for inclusion in the neighborhood, as described above. Each reference document in the selected cluster is associated with a score vector and the distance is determined by comparing the score vector of the cluster center with the score vector of each reference document to determine an x-number of reference documents that are closest to the cluster center. However, other methods for generating a neighborhood are possible. Once determined, one of the classification measures is applied to the neighborhood to determine a suggested classification code and confidence level for the selected cluster.

Figure 8:
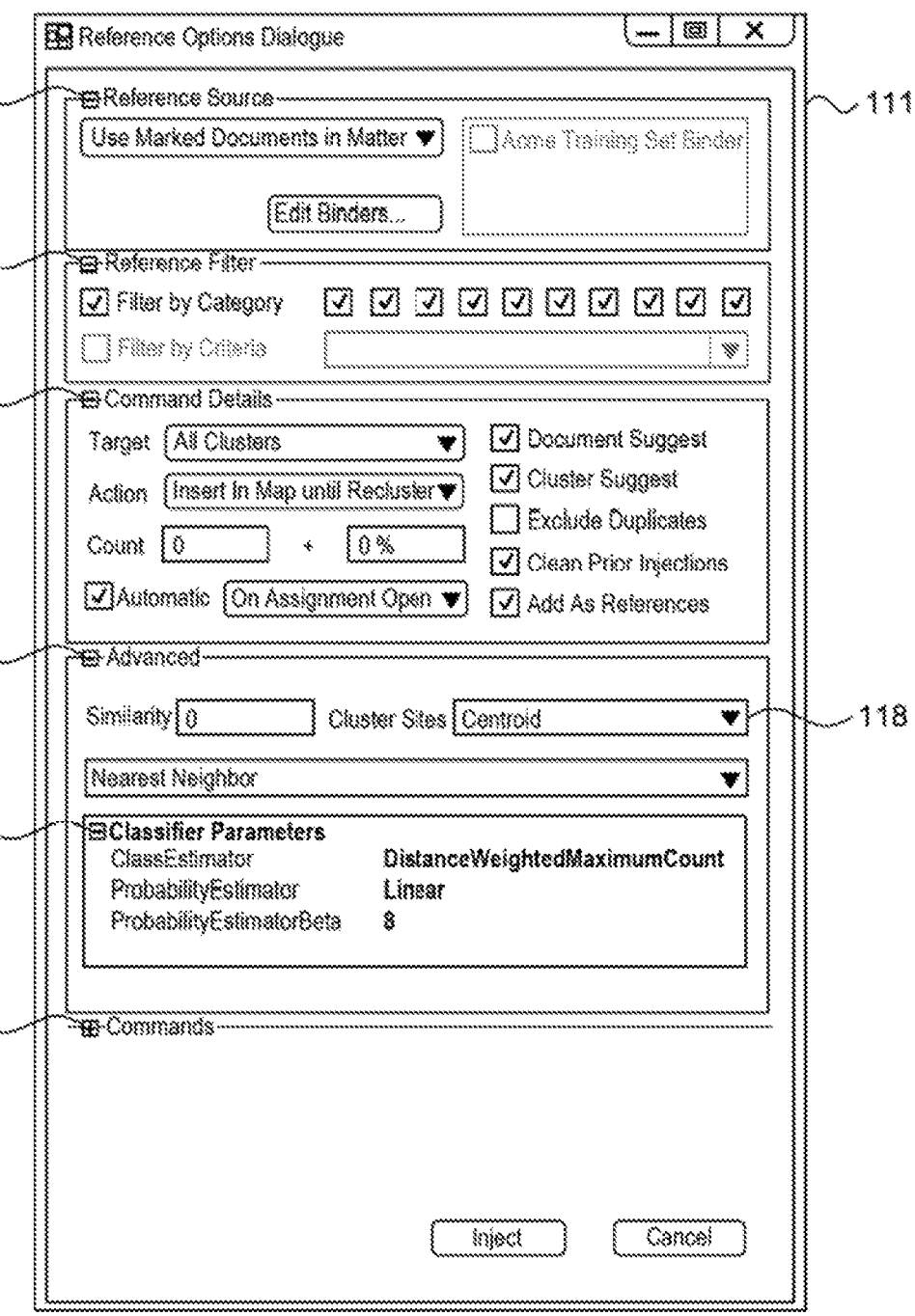
FIG. 8 is a screenshot showing, by way of example, a reference options dialogue box for entering user preferences for clustering documents.

During classification, either by an individual reviewer or a machine, the reviewer can retain control over many aspects, such as a source of the reference documents and a number of reference documents to be selected. FIG. 8 is a screenshot 110 showing, by way of example, an options dialogue box 111 for entering user preferences for clustering and display of the uncoded documents and reference documents. The dialogue box 111 can be accessed via a pull-down menu as described above with respect to FIG. 5. Within the dialogue box 111, the reviewer can utilize user-selectable parameters to define a reference source 112, category filter 113, command details 114, advanced options 115, classifier parameters 116, and commands 117. Each user-selectable option can include a text box for entry of a user preference or a drop-down menu with predetermined options for selection by the reviewer. Other user-selectable options and displays are possible.

The reference source parameter 112 allows the reviewer to identify one or more sources of the reference documents. The sources can include all reference documents for which the associated classification has been verified, all reference documents that have been analyzed, and all reference documents in a particular binder. The binder can include reference documents particular to a current document review project or that are related to a prior document review project. The category filter parameter 113 allows the reviewer to generate and display the subset of reference documents using only those reference documents associated with a particular classification code. Other options for generating the reference set are possible, including custodian, source, and content. The command parameters 114 allow the reviewer to enter instructions regarding actions for the uncoded and reference documents, such as indicating counts of the documents, and display of the documents. The advanced option parameters 115 allow the reviewer to specify clustering thresholds and classifier parameters. The parameters entered by the user can be compiled as command parameters 116 and provided in a drop-down menu on a display of the clusters. Other user selectable parameters, options, and actions are possible.

Providing suggestions for classification has been described in relation to uncoded documents and reference documents; however, in a further embodiment, suggestions can be provided for tokens extracted from the uncoded documents using reference tokens. For example, the uncoded tokens and reference tokens are clustered and displayed to provide classification suggestions based on relationships between the uncoded tokens and similar reference tokens. The uncoded documents can then be classified based on the classified tokens. In one embodiment, the tokens include concepts, n-grams, raw terms, and entities.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for inclusion-based electronically stored information item cluster visual representation, comprising:
    a non-transitory computer readable storage medium comprising program code; and
    a computer processor configured coupled to the storage medium, wherein the processor is configured to execute the program code to perform steps to:
        maintain a set of reference electronically stored information items;
        select from the set a subset of the electronically stored information items, each of the reference electronically stored information items in the subset associated with a classification code, each of the classification codes associated with a visual representation different from the visual representations of the remaining classification codes;
        combine the subset with a set of uncoded electronically stored information items, each of the uncoded electronically stored information items associated with a visual representation different from the visual representations of the classification codes;
        group the combined electronically stored information items into clusters, further comprising:
            convert each of the combined electronically stored information items into one or more tokens;
            generate a score vector for each of the electronically stored information items based on the tokens associated with that electronically stored information item, further comprising:
                score each of the tokens;
                generate paired values for each of the combined electronically stored information items comprising paring the token with the score associated with that token; and
                for each of the combined electronically stored information items, order the paired values along a vector for that combined electronically stored information item to create the score vector for that electronically stored information item, wherein the tokens are ordered along the vector based on a frequency of the tokens within that combined electronically stored information item; and
            compare the score vector for each of the combined electronically stored information items, wherein the clustering is performed based on the comparison; and
        visually represent each of the clusters comprising displaying the visual representation associated with the code of each of the reference electronically stored information items in that cluster and the visual representation associated with each of the uncoded electronically stored information item in that cluster.

2. The system according to claim 1, wherein the reference electronically stored information items in the subset are randomly selected from the set.

3. The system according to claim 1, the steps further comprising:
    obtain item selection criteria comprising one or more of reviewer preference, classification category, electronically stored information item source, electronically stored information item content, and an electronically stored information item review project for which the subset is selected;
    wherein the subset of the reference electronically stored information items is selected using the item selection criteria.

4. The system according to claim 1, the steps further comprising:
    determine a number of the reference electronically stored information items selected into the subset based one or more reference factors, the reference factors comprising a size of a review project for which the subset is selected, an average size of the reference electronically stored information items, types of the classification codes, and a number of the reference electronically stored information items associated with each of the classification codes.

5. The system according to claim 1, wherein the subset comprises more than one occurrence of at least one of the reference electronically stored information items.

6. The system according to claim 1, wherein the visual representation of one of the reference documents associated with one of the classification codes comprises at least one of a symbol, shape, and color.

7. The system according to claim 6, wherein visually representing each of the clusters further comprises displaying a shape within which the visual representations for the reference electronically stored information items and uncoded electronically stored information items are displayed.

8. A computer-implemented method for inclusion-based electronically stored information item cluster visual representation, comprising the steps of:
    maintaining a set of reference electronically stored information items;
    selecting from the set a subset of the electronically stored information items, each of the reference electronically stored information items in the subset associated with a classification code, each of the classification codes associated with a visual representation different from the visual representations of the remaining classification codes;
    combining the subset with a set of uncoded electronically stored information items, each of the uncoded electronically stored information items associated with a visual representation different from the visual representations of the classification codes;
    grouping the combined electronically stored information items into clusters, further comprising:
        converting each of the combined electronically stored information items into one or more tokens;

generating a score vector for each of the electronically stored information items based on the tokens associated with that electronically stored information item, further comprising:

scoring each of the tokens;

generating paired values for each of the combined electronically stored information items comprising paring the token with the score associated with that token; and for each of the combined electronically stored information items, ordering the paired values along a vector for that combined electronically stored information item to create the score vector for that electronically stored information item, wherein the tokens are ordered along the vector based on a frequency of the tokens within that combined electronically stored information item; and comparing the score vector for each of the combined electronically stored information items, wherein the clustering is performed based on the comparison; and visually representing each of the clusters comprising displaying the visual representation associated with the code of each of the reference electronically stored information items in that cluster and the visual representation associated with each of the uncoded electronically stored information item in that cluster, wherein the steps are performed on a suitably-programmed computer.

9. The method according to claim 8, wherein the reference electronically stored information items in the subset are randomly selected from the set.

10. The method according to claim 8, further comprising the steps of:

obtaining item selection criteria comprising one or more of reviewer preference, classification category, electronically stored information item source, electronically stored information item content, and an electronically stored information item review project for which the subset is selected;

wherein the subset of the reference electronically stored information items is selected using the item selection criteria.

11. The method according to claim 8, further comprising:

determining a number of the reference electronically stored information items selected into the subset based one or more reference factors, the reference factors comprising a size of a review project for which the subset is selected, an average size of the reference electronically stored information items, types of the classification codes, and a number of the reference electronically stored information items associated with each of the classification codes.

12. The method according to claim 8, wherein the subset comprises more than one occurrence of at least one of the reference electronically stored information items.

13. The method according to claim 8, wherein the visual representation of one of the reference documents associated with one of the classification codes comprises at least one of a symbol, shape, and color.

14. The method according to claim 13, wherein visually representing each of the clusters further comprises displaying a shape within which the visual representations for the reference electronically stored information items and uncoded electronically stored information items are displayed.

* * * * *